US006950540B2

(12) United States Patent
Higuchi

(10) Patent No.: US 6,950,540 B2
(45) Date of Patent: *Sep. 27, 2005

(54) FINGERPRINT APPARATUS AND METHOD

(75) Inventor: Teruyuki Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/932,335

(22) Filed: Sep. 2, 2004

(65) Prior Publication Data

US 2005/0036665 A1 Feb. 17, 2005

Related U.S. Application Data

(63) Continuation-in-part of application No. 09/494,506, filed on Jan. 31, 2000, now Pat. No. 6,829,375.

(30) Foreign Application Priority Data

Aug. 12, 2004 (JP) ........................................ 2004-235160

(51) Int. Cl.$^7$ ................................................ G06K 9/00
(52) U.S. Cl. ...................................................... 382/124
(58) Field of Search ................................ 382/115, 116, 382/124–127; 356/71; 340/5.82, 5.83, 5.53; 250/216, 227.28, 556

(56) References Cited

U.S. PATENT DOCUMENTS

| 4,924,085 | A |   | 5/1990 | Kato et al. |
| 5,416,573 | A |   | 5/1995 | Sartor, Jr. |
| 6,016,355 | A |   | 1/2000 | Dickinson et al. |
| 6,055,324 | A |   | 4/2000 | Fujieda |
| 6,061,463 | A | * | 5/2000 | Metz et al. ................. 382/124 |
| 6,091,839 | A |   | 7/2000 | Uchida |
| 6,115,483 | A |   | 9/2000 | Suga |
| 6,150,665 | A |   | 11/2000 | Suga |
| 6,289,114 | B1 |   | 9/2001 | Mainguet |
| 6,381,347 | B1 | * | 4/2002 | Teng et al. ................. 382/127 |
| 6,414,297 | B1 |   | 7/2002 | Sasaki et al. |
| 6,636,144 | B1 |   | 10/2003 | Hirakawa |
| 6,636,620 | B1 |   | 10/2003 | Hoshino |
| 6,829,375 | B1 | * | 12/2004 | Higuchi ...................... 382/124 |
| 2002/0040961 | A1 |   | 4/2002 | Okamoto et al. |
| 2003/0063783 | A1 |   | 4/2003 | Higuchi |
| 2003/0099381 | A1 |   | 5/2003 | Ohba |
| 2003/0118219 | A1 |   | 6/2003 | Higuchi |
| 2003/0194114 | A1 |   | 10/2003 | Mitsuyu et al. |
| 2004/0068669 | A1 |   | 4/2004 | Uchida |

FOREIGN PATENT DOCUMENTS

| JP | 01-281583 | 11/1989 |
| JP | 05-266174 | 10/1993 |
| JP | 06-300930 | 10/1994 |
| JP | 07-171137 | 7/1995 |
| JP | 08-180173 | 7/1996 |
| JP | 11-259368 | 9/1999 |

OTHER PUBLICATIONS

Japanese office action, Dated Nov. 26, 2001, with English translation of Japanese Examiner's comments.

* cited by examiner

*Primary Examiner*—Vikkram Bali
(74) *Attorney, Agent, or Firm*—Whitham, Curtis & Christofferson, PC

(57) ABSTRACT

A fingerprint input apparatus includes an image sensor which responds to scattered light emanating from a finger. The scattered light is generated inside a finger having a fingerprint pattern in accordance with external light. The sensor may be a two-dimensional image sensor made of a large number of light-receiving elements arranged in a two-dimensional array or a one-dimensional sensor made of a large number of light-receiving elements arranged in a line-type array. In the latter case, the fingerprint is input by swiping the finger across the image sensor and reconstructing the fingerprint image. The fingerprint input apparatus is used to control use of a variety of devices, including electronic devices such as cellular telephones and personal computers, and access to buildings, rooms, safes and the like. The fingerprint input apparatus makes possible the elimination of personal identification numbers (PINs) and signatures in a variety of transactions.

39 Claims, 15 Drawing Sheets

FINGERPRINT APPARATUS AND METHOD

CROSS-REFERENCE TO RELATED APPLICATION

This application is a continuation-in-part of patent application Ser. No. 09/494,506 filed Jan. 31, 2000, now U.S. Pat. No. 6,829,375, by Teruyuki Higuchi for "Fingerprint Input Apparatus", the benefit of priority based on commonly disclosed subject matter is hereby claimed.

DESCRIPTION

BACKGROUND OF THE INVENTION

1. Field of the Invention

The present invention generally relates to fingerprint apparatus and fingerprint method using a fingerprint input apparatus capable of directly reading a fingerprint image and, more particularly, to personal identification and security systems and methods using such fingerprint input apparatus.

2. Background Description

In a conventional fingerprint input apparatus, the skin surface of the fingertip is irradiated with light at a predetermined angle using optical components such as a lens and prism or optical fiber. The light reflected by the skin surface is focused to output a fingerprint image. In another conventional fingerprint input apparatus, an apparatus that emits a light toward a portion of a finger other than the finger pad and detects a light emerging from the inside of the finger. The apparatus has a special component between a finger and an image sensor which selectively reflects the light emerging from the finger Alternatively, a scheme of directly inputting a fingerprint image using an electrostatic capacitance instead of obtaining a fingerprint image using the optical system has been proposed.

U.S. Pat. No. 6,414,297 (corresponding to Japanese patent JP 11-259638) to Sasaki, a two-dimensional photo-sensor is provided over a surface light source. The surface light source emits light upwardly to the finger pad. The light reflected by the surface of the finger is detected by the two-dimensional photo-sensor a the semiconductor layer. With the radiation of the light, electron-hole pairs are accumulated in the channel region of the semiconductor layer resulting in a flow of a drain current. The acquired image has bright ridge portions and dark valley portions. A transparent conductive layer is interposed between the two-dimensional photo-sensor and the finger. The transparent conductive layer dissipates static electricity, which may cause a malfunction of the two-dimensional phot-sensor.

U.S. Pat. No. 6,381,347 to Teng discloses an apparatus for detecting the light scattered by the ridge portion of the finger pad by use of a prism, which is provided between a fingerprint and an image sensor. A light emitted from a light source strikes a scattering surface and internally scatters in prism. A relatively large percentage of incident light will strike imaging surface at an angle less than the critical angle. An incident light which strikes a fingerprint valley will substantially pass through the imaging surface. Light striking a fingerprint ridge will substantially scatter and produce a scattering light, which will be detected by an image sensor through a lens assembly 314. The acquired image has bright ridge portions and dark valley portions.

Japanese Patent No. JP 8-180173A to Fujieda discloses an apparatus comprising a flat light source, an edge sensor, and an optical component. The light emitted from the flat light source goes through the image sensor and reaches the optical component. The optical component creates a tilt in the path of the light emitted from the flat light source. The light with a tilt strikes a finger pad and a reflected light is produced. The reflected light reaches an image sensor through the optical component.

Japanese Patent No. JP 1-281583 A to Kato discloses an apparatus detecting a light emerging from the inside of the finger rather than a light reflected by the surface thereof. The apparatus includes a light guide board and LEDs. The LEDs emit light toward side portions of a finger. A portion of the light enters the finger and reaches the interface surface between the finger and the light guide board. A light emerging from the valley portion passes through the light guide board and disappears. A portion of the light emerging from the ridge portion travels inside the light guide board repeating total internal reflections and reaches a detector. The acquired image has bright ridge portions and dark valley portions.

Japanese Patent No. JP 7-171137 A to Tomita discloses an apparatus for detecting a light emerging from the inside of the finger by means of a fiber optical plate (FOP) 1. A light source downwardly irradiates a fingernail side of a finger. The light emerging from the inside of the finger is received by the FOP. The FOP includes a number of optical fibers each of which comprises a core, a clad and an absorbing body. An edge surface of the FOP is shaped to have a slope of an angle $\theta$. The angle $\theta$ is carefully selected such that an incident light entering from air in the valley portion does not undergo total internal reflection at the interface between the core and the clad, and would be absorbed by the absorbing body, irrespective of the angle of incidence. Because the finger has an index of reflection different from that of air, a portion of an incident light entering from the ridge portion undergoes a total internal reflection, travels inside the FOP, and then reaches a CCD sensor. The acquired image has bright ridge portions and dark valley portions.

Japanese Patent No. JP 6-300930 A to Shikai discloses an apparatus similar to that of Tomita. The apparatus of Shikai includes lighting means and a bundle of optical fiber. The lighting means emits a light toward the tip of a finger. The bundle of optical fiber has an oblique incident surface. The oblique angle of the incident surface is selected such that a light emerging from the ridge portion travels through the optical fiber and a light emerging from the valley portion does not. The acquired image has bright ridge portions and dark valley portions.

The first category of references discloses an apparatus that emits light toward a finger pad and detects a light reflected from the surface thereof. The Sasaki, Teng and Fujieda references fall into this first category. The second category of references discloses an apparatus that emits a light toward a portion of a finger other than the finger pad and detects a light emerging from the inside of the finger. The Kato, Tomita and Shikai references fall in the second category.

In these conventional fingerprint input apparatuses, when the optical components such as a lens and prism or a fiber are used, a space for the sizes of these optical components and their mounting positions is required to result in a large thickness and size of the apparatus. In addition, since these optical components are relatively expensive, the apparatus cannot be manufactured at low cost. When the fingerprint image is optically processed using these optical components, the resultant image tends to distort.

U.S. Pat. No. 6,016,355 to Dickinson discloses a transparent non-conductive layer provided over a sensor. The apparatus disclosed in the Dickinson reference measures a change in capacitance with respect to the parasitic capacitance caused by an uneven surface of a finger pad. An insulating material such as glass or plastic is disposed above sensing elements as a sensing surface.

U.S. Pat. No. 6,055,324 to Fujieda discloses a fingerprint entry device of the electrostatic capacitance sensing type. The fingerprint entry device has an electrode in the form of mesh or comb for radiating a high frequency wave toward a finger, a plurality of signal sensing electrodes for forming electrostatic capacitance between the electrodes and the finger and a switching means for consecutively connecting each of the signal sensing electrodes to a signal sensing circuit.

The scheme of directly inputting a fingerprint image using electrostatic capacitance is susceptible to external static electricity and difficult to obtain a high sensitivity.

U.S. Pat. No. 6,636,620 to Hoshino discloses a personal identification system for a client terminal in communication with a server. In this system, a client terminal user impresses one's fingerprint on a fingerprint sensor and puts an one's IC card into a card reader. The IC card stores personal information of a card owner, which information includes information related to a fingerprint and an ID number of the card owner. The client terminal includes an authenticator, which provides an authenticating signal if the sensed fingerprint information of the client terminal user matches stored fingerprint information of the card owner. The client terminal transmits the stored personal information of the card owner to the server upon occurrence of the authenticating signal. The server, in turn, transmits an authorizing signal to the client terminal if the transmitted personal information of the card owner matches stored personal information on a server database. Upon receiving the authorizing signal, the client terminal user is authorized to access a computer of the server.

SUMMARY OF THE INVENTION

It is therefore an object of the present invention to provide an improved fingerprint input apparatus for use in fingerprint apparatuses and methods.

It is another object of the invention to provide apparatuses, devices and methods using the fingerprint input apparatus of the invention for secure transactions.

It is a further object of the invention to provide apparatuses, devices and methods using the fingerprint input apparatus of the invention for providing secure entry buildings, rooms, lockers, display cases and vehicles.

It is yet another object of the invention to provide apparatuses, devices and methods using the fingerprint input apparatus of the invention for providing secure access to currency, documents and valuables and, in addition, provide a way to notify police or security personnel in the case of an emergency.

It is still another object of the invention to provide apparatuses, devices and methods using the fingerprint input apparatus of the invention to control or limit access to communication functions, Internet Web sites, or television channels.

It is yet a further object of the invention to provide a fingerprint apparatuses and methods which eliminates the need for personal identification numbers (PINs) or signatures in commercial transactions.

According to the invention, there is provided there is provided a fingerprint input apparatus wherein scattered light is generated inside a finger having a fingerprint pattern in accordance with external light, the fingerprint pattern being made up of a ridge portion and a valley portion, and a two-dimensional image sensor made of a large number of light-receiving elements arranged in a two-dimensional array, an image of the fingerprint pattern being input to a light-receiving surface of the light-receiving element, wherein the light-receiving element whose light-receiving surface is in substantially contact with the ridge portion detects as the ridge portion a bright portion where the scattered light emerging from the finger reaches at a high intensity, and the light-receiving element whose light-receiving surface corresponds to the valley portion via a space detects as the valley portion a dark portion where the scattering light emerging from the finger reaches at a low intensity.

This basic construction of the fingerprint input apparatus is made smaller by reducing the two-dimensional image sensor in one dimension so as to approach a one-dimensional or line-type sensor wherein the fingerprint is swiped over the sensor and the thus swiped fingerprint is reconstructed.

The simplicity and compactness of the fingerprint input apparatus permits application to a variety of apparatuses and devices. For example, the fingerprint input apparatus of the invention may be used in connection with cellular telephones and personal computers to control use of those apparatuses or devices and for user identification for secure on-line financial transactions. Similarly, the fingerprint input apparatus of the invention may be used in place of a personal identification number (PIN) for conducting financial transactions using automated teller machines (ATMs), and a signature is no longer required when using a credit card. More particularly, the use of the fingerprint input apparatus of the invention obviates the need for a PIN or other identifying badge, card or other identifying device. Therefore, the requirement and expense of a keypad for entry to a building, room or vehicle is eliminated by the use of the fingerprint input apparatus of the invention. Similarly, the requirement of a combination lock or the like for access to safes, lockers or the like is also eliminated by the use of the fingerprint input apparatus of the invention.

For the application of the fingerprint input apparatus to control entry to a vehicle, such as a personal automobile, fingerprints of more than one owner/operator of the vehicle can be registered to permit each such owner/operator to enter and use the vehicle. In such case, seat and mirror positions previously stored in memory for each such owner/operator are automatically accessed and used to make seat and mirror adjustments upon determining that a fingerprint is that of the corresponding owner/operator of the vehicle.

Where access to cash, securities or valuables is controlled, such as a cash register or point of sale (POS) terminal, safe or jewelers case, two fingerprints or each individual authorized to have access to the cash, securities or valuables are registered. Ordinarily, only one fingerprint is used to open the cash register or point of sale (POS) terminal, safe or jewelers case, for example, but in the case of an emergency, such as an attempted robbery, the second fingerprint is used to automatically send an alarm to police or other security personnel.

The fingerprint input apparatus of the invention may be incorporated into telephones or personal computer keyboards, mice or other input devices or into remote control devices to limit access to communication functions, Internet Web sites, or television channels. For example, long distance telephone calls can be limited to authorized persons on business telephones. In like manner, access to selected Web sites can be restricted. When incorporated into a television remote control device, selected television channels can be restricted. In this latter case, a "parents' guide" to TV ratings can be used to define the restriction. When the personal computer is connected to a local area network (LAN), the fingerprint input apparatus can be used to initiate the login procedure for the individual using the personal computer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
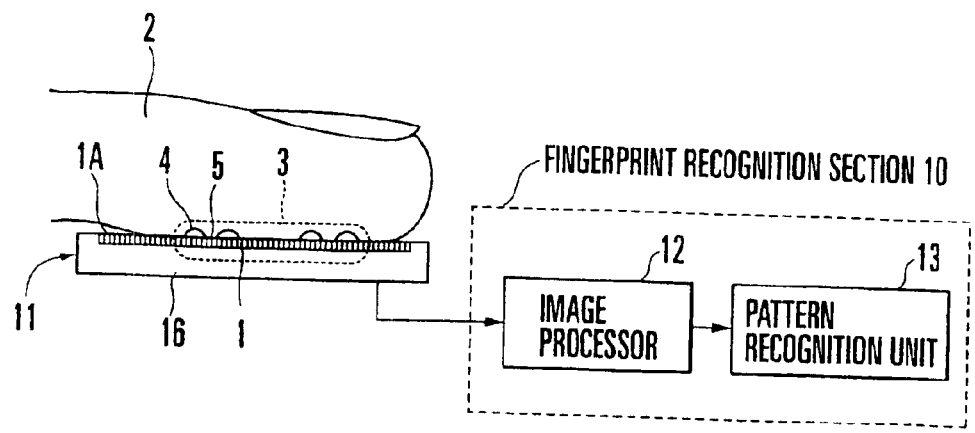
FIG. 1 is a view showing the schematic arrangement of a fingerprint input apparatus using a two-dimensional image sensor.

Referring now to the drawings, and more particularly to FIG. 1, there is shown a fingerprint input apparatus according to the first embodiment of the present invention. In FIG. 1, reference numeral 11 denotes a two-dimensional image sensor (to be referred to as an image sensor hereinafter) for two-dimensionally detecting the light intensity in accordance with the three-dimensional pattern of a skin surface 3 of a finger 2; 12, an image processor (D for image-processing an output from the image sensor 11 to generate a fingerprint pattern; and 13, a pattern recognition unit for extracting the features of the fingerprint pattern generated by the image processor 12 and recognizing the pattern by comparing the extracted features with a predetermined reference pattern.

Figure 2:
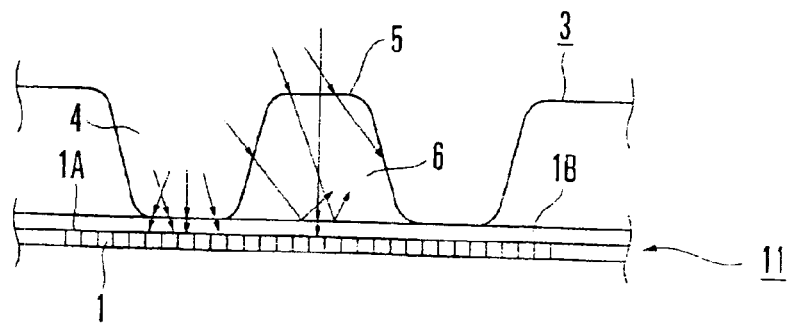
FIG. 2 is a view showing the light-receiving state of the two-dimensional image sensor shown in FIG. 1.

The image sensor 11 comprises a substrate 16 and a large number of light-receiving elements 1 two-dimensionally arranged in a matrix on the substrate 16. A two-dimensional image is formed on the basis of an output from each light-receiving element 1. As shown in FIG. 2, a transparent cover 1B comprising a transparent member made of glass is formed on the image sensor 11 to protect a light-receiving surface 1A of each light-receiving element 1. The pitch of the light-receiving elements 1 must be smaller than the pitch of ridge portions (projections) 4 or valley portions (recesses) 5 of the skin surface 3. If the pitch of the light-receiving elements 1 is 50 $\mu$m or less, an image having precision enough to perform pattern recognition can be obtained. A CCD (Charge-Coupled Device) sensor is used as the image sensor 11.

In this embodiment, scattered light emerging from the finger 2 is generated by ambient light of the finger 2 without using any light source. The image processor 12 and pattern recognition unit 13 construct a fingerprint recognition section 10 and can be made up of known circuits.

To recognize the skin surface 3 of the finger 2, as shown in FIG. 2, the finger 2 is placed on the image sensor 11 such that the skin surface 3 is in contact with the transparent cover 1B. At this time, the ridge portions 4 of the skin surface 3 are in contact with the transparent cover 1B of the image sensor 11. Scattered light from the inside of the finger 2 is directly received from the ridge portions 4 to the light-receiving elements 1 via the transparent cover 1B.

A space 6 is formed between the transparent cover 1B and each valley portion 5 of the skin surface 3. Scattered light emerging from the finger 2 to the space 6 via the valley portion 5 is refracted and scattered at the interface between the skin and air and is then diffused in the space 6. The amount of light reaching the light-receiving element via the space 6 greatly reduces. Part of light reaching the transparent cover 1B is reflected on the surface of the transparent cover 1B due to the relationship between the incident angle on the transparent cover 1B and the refractive 10 indices of the air and transparent cover 1B in the space 6. While light from the ridge portion directly contacting the transparent cover 1B is detected at a high intensity, while light reaching from the valley portion 5 via the space 6 is detected at a low intensity. Therefore, the ridge portion 4 is detected as a bright portion, while the valley portion 5 is detected as a dark portion.

As described above, the light-receiving elements 1 whose light-receiving surfaces 1A are almost in contact with the ridge portions 4 detect as the ridge portion 4 the bright portion that the scattered light from the inside of the finger 2 reaches at a high intensity. The light-receiving elements 1 whose light-receiving surfaces 1A correspond to the valley portion 5 and the space 6 detect as the valley portion 5 the dark portion where scattered light from the inside of the finger 2 reach at a low intensity.

According to this embodiment, the optical components such as a lens and prism or a fiber are not required. As compared with a conventional structure, limitations on the physical sizes by the sizes of optical components themselves and their mounting positions can be eliminated. For example, a low-profile, compact fingerprint input apparatus having a size enough to be incorporated in an IC card required for verification of a cardholder can be implemented. Since optical processing by optical components need not be performed, special image correction processing need not be performed to obtain a fingerprint image free from distortion, thereby increasing the recognition ratio of the fingerprint pattern.

Figure 3:
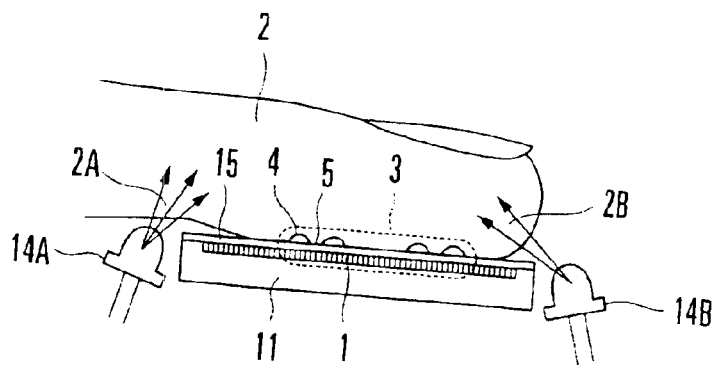
FIG. 3 is a view showing the schematic arrangement of a fingerprint input apparatus provided with auxiliary light sources.

Referring to FIG. 3, a pair of light sources 14A and 14B can be arranged to interpose an image sensor 11 between them. Light sources for emitting near-infrared rays, e.g., near-infrared LEDs can be used as the light sources 14A and 14B, and a thin film filter 15 for transmitting near-infrared rays and reducing disturbance light such as visible light can be arranged. In this case, an image sensor capable of receiving a near-infrared ray must be selected as the image sensor 11. A general CCD image sensor can receive the near-infrared rays.

According to this modification, since disturbance light such as light from a fluorescent lamp or sunbeam can be reduced, noise caused by the disturbance light can be reduced to allow efficiently inputting a fingerprint image even in an environment where a large number of disturbance light components are present. A transparent cover 1B may be comprised of a cover having the function of a filter 15. In this case, the number of components can be reduced.

As has been described above, according to the present invention, optical components such as a lens and prism or an optical fiber can be omitted. For this reason, as compared with a conventional structure, limitations on the physical sizes by the sizes of optical components themselves and their mounting positions can be eliminated. A low-profile, compact apparatus can be implemented.

Since optical processing by the optical components need not be performed, a fingerprint image is free from distortion can be obtained without performing special image correction processing. The recognition ratio of the fingerprint pattern can increase.

Figure 4:
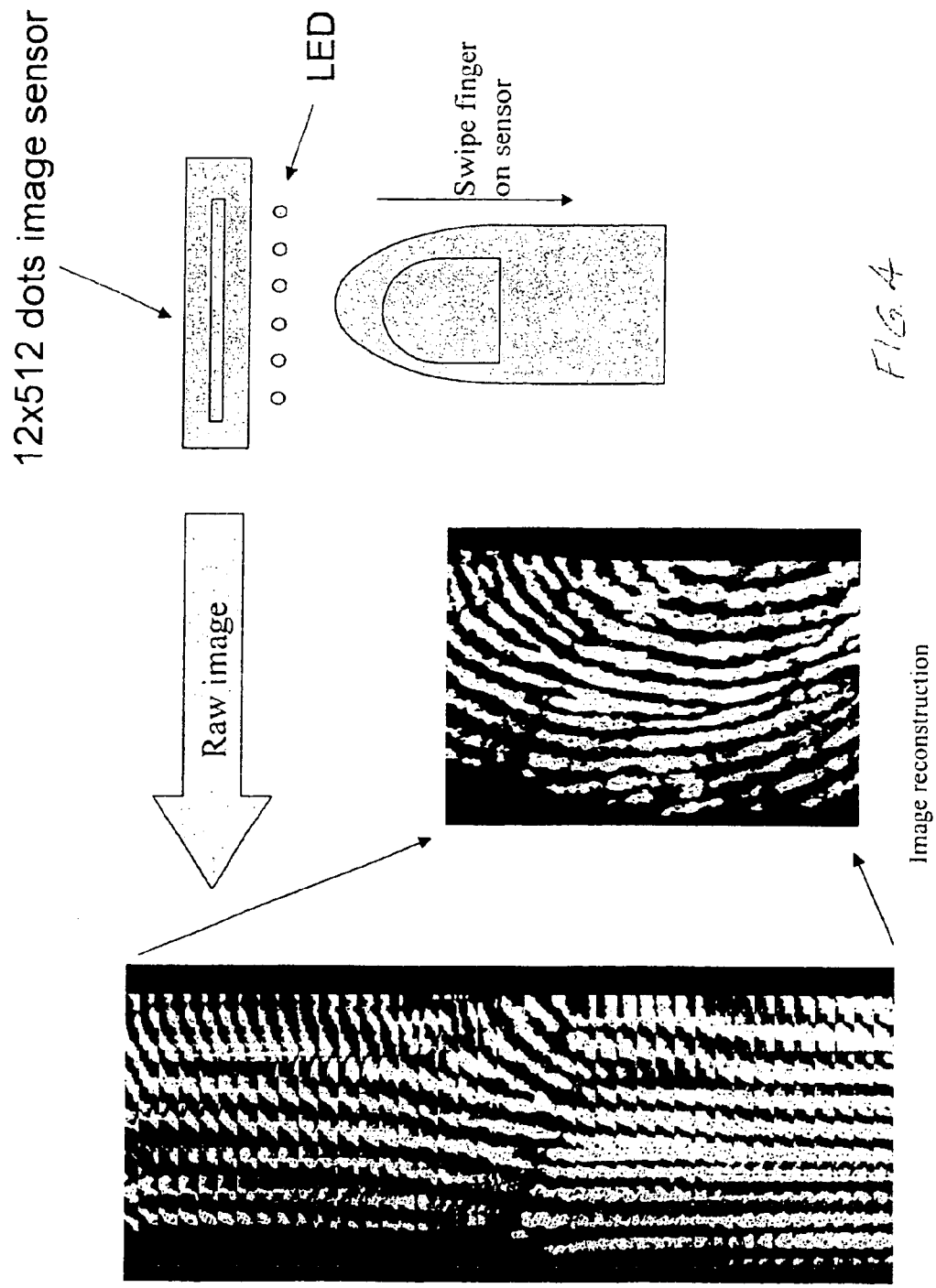
FIG. 4 is an illustration of a one-dimensional swipe-type fingerprint input apparatus and fingerprint image reconstruction.

FIG. 4 shows a modification of the basic fingerprint input apparatus according to the invention which has particular application where space is limited. According to this modification, the image sensor is reduced in one dimension to approximate a one-dimensional image sensor 41, here shown as a 12×512 dots CCD image sensor. In this embodiment, the finger 42 is swiped across the image sensor 41 to produce a continuous raw image 43. This raw image is processed by the fingerprint recognition section, such as the fingerprint recognition section 10 in FIG. 1, to reconstruct the fingerprint image 44 for fingerprint recognition. An example of the processing of the raw image to the reconstructed fingerprint image is disclosed in U.S. Pat. No. 6,289,114 to Mainguet. As in the embodiment shown in FIG. 3, LEDs 45 can be provided adjacent the image sensor 41.

The simplicity and economy of construction of the basic image sensor shown in FIGS. 1 to 3 and the modification shown in FIG. 4 as well as the accuracy of fingerprint imaging produced by these fingerprint input devices make possible a variety of applications not heretofore possible, as will be described in more detail hereinafter.

Figure 5:
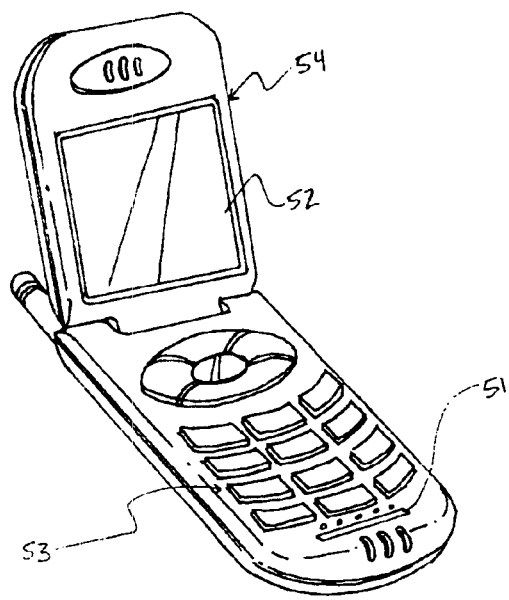
FIG. 5 is an illustration of a cellular telephone equipped with fingerprint input apparatus of the invention.

The modification of the basic invention as shown in FIG. 4 is particularly advantageous when applied to, for example, a cellular telephone as shown in FIG. 5. Such a cellular telephone typically has a display area 52 and a keypad area 53. The particular type of cellular telephone shown is the so-called flip-type having two hinged parts, one containing the display area 54 and the other containing the keypad area 53, but the invention may be applied to other types of cellular telephones. Because of the very limited areas available on cellular telephones due to increased miniaturization, there typically is not sufficient area on the cellular telephone for an image sensor of the type shown in FIGS. 1 to 3, even though this type of image sensor is itself very small and compact. Therefore, the swipe-type image sensor of FIG. 4 is advantageously used for the cellular telephone. In FIG. 5, a swipe-type finger print input apparatus 51 is conveniently integrated in the cellular telephone at a position just below the keypad area 53. Other locations may also be used.

Figure 6:
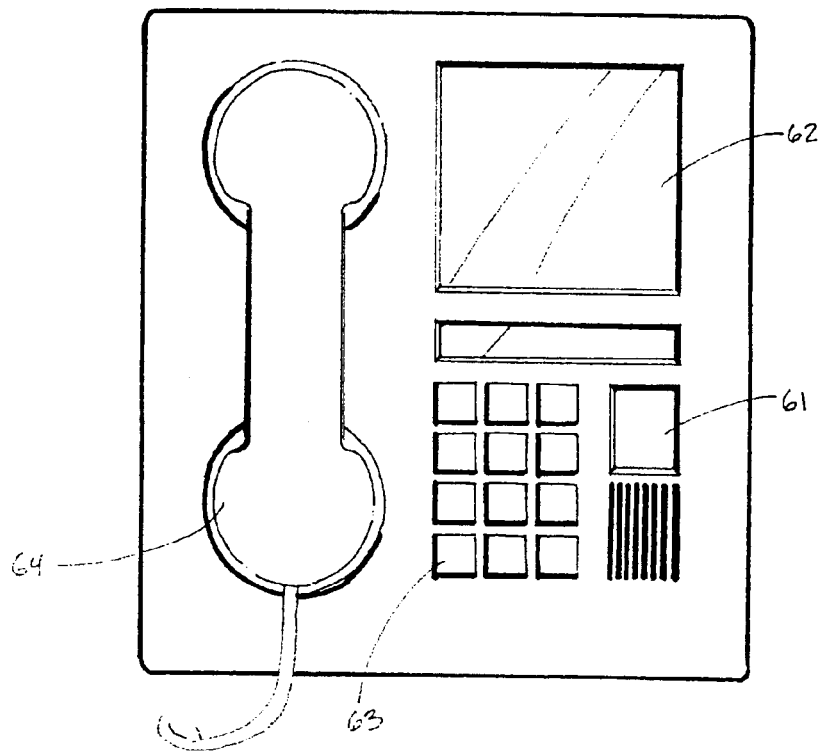
FIG. 6 is an illustration of a standard telephone equipped with fingerprint input apparatus of the invention.

A standard telephone, as shown in FIG. 6, may also be provided with the fingerprint input apparatus of the invention, either the two-dimensional image sensor type of FIGS. 1 to 3 or the swipe-type image sensor type of FIG. 4. The telephone shown in FIG. 6 is, for illustrative purposes only, a business desk type of telephone having a display area 62, a keypad area 63, and a handset 64. The fingerprint input apparatus according to the invention is conveniently incorporated adjacent the keypad area 63 at 61 in this illustrative example.

Figure 7:
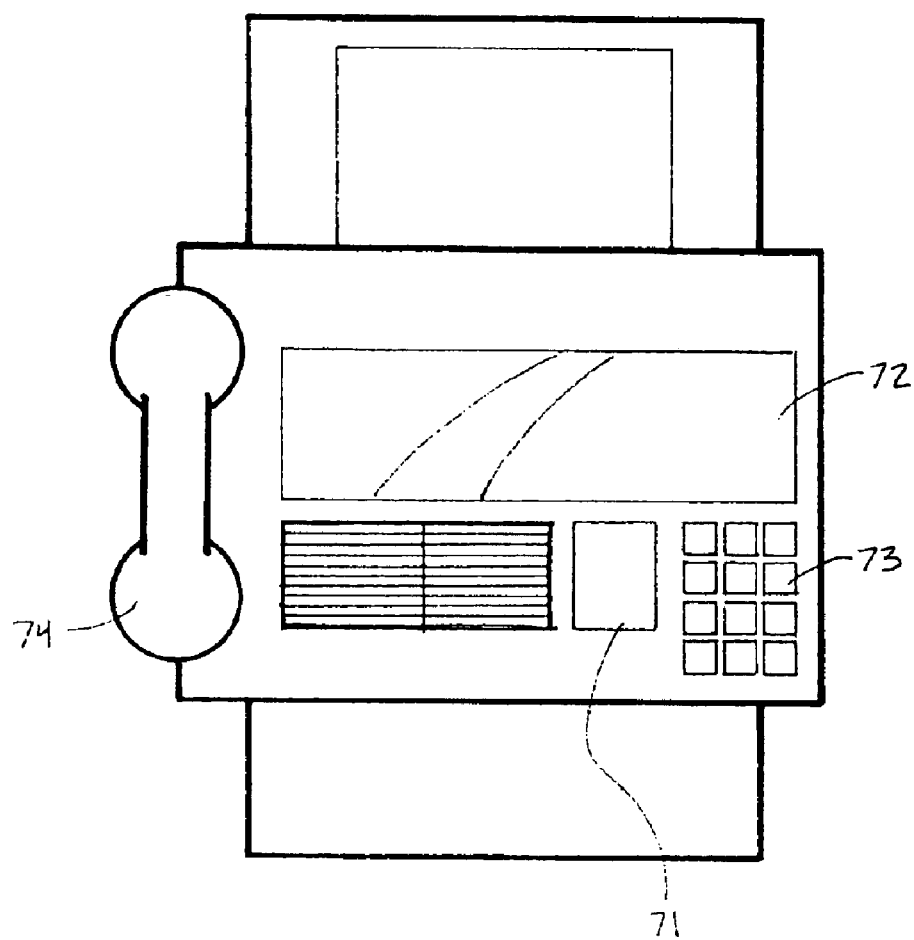
FIG. 7 is an illustration of a facsimile machine equipped with fingerprint input apparatus of the invention.

The fingerprint input apparatus of invention can also be applied to a facsimile machine, as shown in FIG. 7, and again may be either the two-dimensional image sensor type of FIGS. 1 to 3 or the swipe-type image sensor type of FIG. 4. The facsimile machine shown in FIG. 7 is for illustrative purposes only. This facsimile machine includes a display area 72, a keypad area 73, and a handset 74. The fingerprint input apparatus according to the invention is conveniently incorporated above the keypad area 73 at 71 in this illustrative example.

Figure 8:
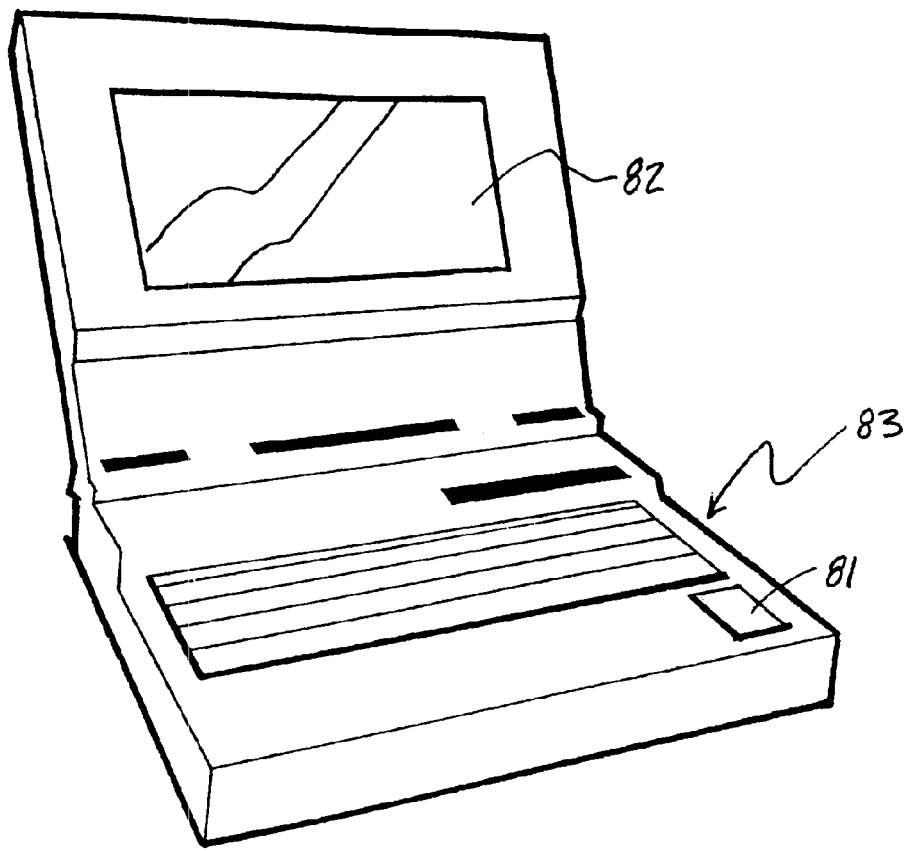
FIG. 8 is an illustration of a personal computer (PC) equipped with fingerprint input apparatus of the invention.
Figure 9:
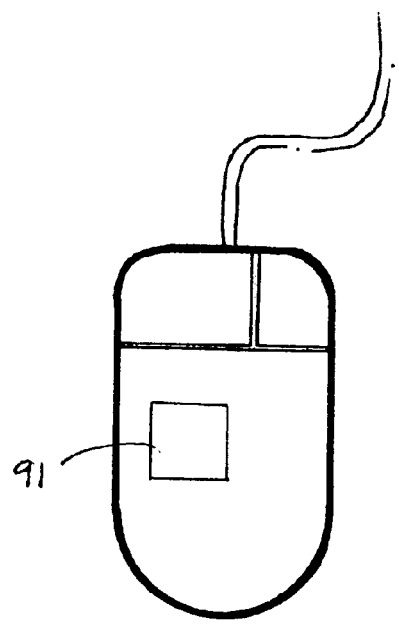
FIG. 9 is an illustration of a PC mouse equipped with fingerprint input apparatus of the invention.

FIG. 8 shows an example of the fingerprint input apparatus incorporated into a personal computer (PC), in this case a laptop PC but desktop PCs and handheld PCs may also be used. The PC has a display area 82 and a keyboard area 83. In this example, the fingerprint input apparatus according to the invention is incorporated into a location in the keyboard area 83 at 81. Again, the fingerprint input apparatus may be either the two-dimensional image sensor type of FIGS. 1 to 3 or the swipe-type image sensor type of FIG. 4, the latter type be preferred for handheld PCs. An alternate location for the fingerprint input apparatus is on a cursor controlling device, such as a mouse as shown in FIG. 9. A two-button mouse is shown in this exemplary example, but the invention is not limited to this particular type of mouse. In this example, the fingerprint input apparatus of the invention is located on the main body of the mouse at 91, just below the left hand button of the mouse, and again the fingerprint input apparatus may be either the two-dimensional image sensor typ of FIGS. 1 to 3 or the swipe-type image sensor shown in FIG. 4.

The application of the fingerprint input apparatus according to the invention to each of the examples shown in FIGS. 5 to 9 may be used for a variety of purposes. First, the use of fingerprint identification of a user may be used to limit the use the device itself. Thus, for example, in the case of cellular telephone shown in FIG. 5, the owner of the cellular telephone could limit use of the cellular telephone to only him or herself. This would be done by first turning power on to the cellular telephone and then inputting the user's fingerprint in order to be able to dial a number. In the case of the telephone shown in FIG. 6 and the facsimile machine shown in FIG. 7, a similar limitation could be imposed. More practically, however, since these devices are typically used in offices, the limitation might be to limiting long distance calls. A user imposed limitation could also be imposed for a personal computer, particularly a laptop computer, such as illustrated in FIG. 8, or a handheld computer since such computers are often subject to theft. In the case of computers connected in a local area network (LAN), logon to the network would be by way of inputting a fingerprint, rather than a password or other identifier.

Figure 10:
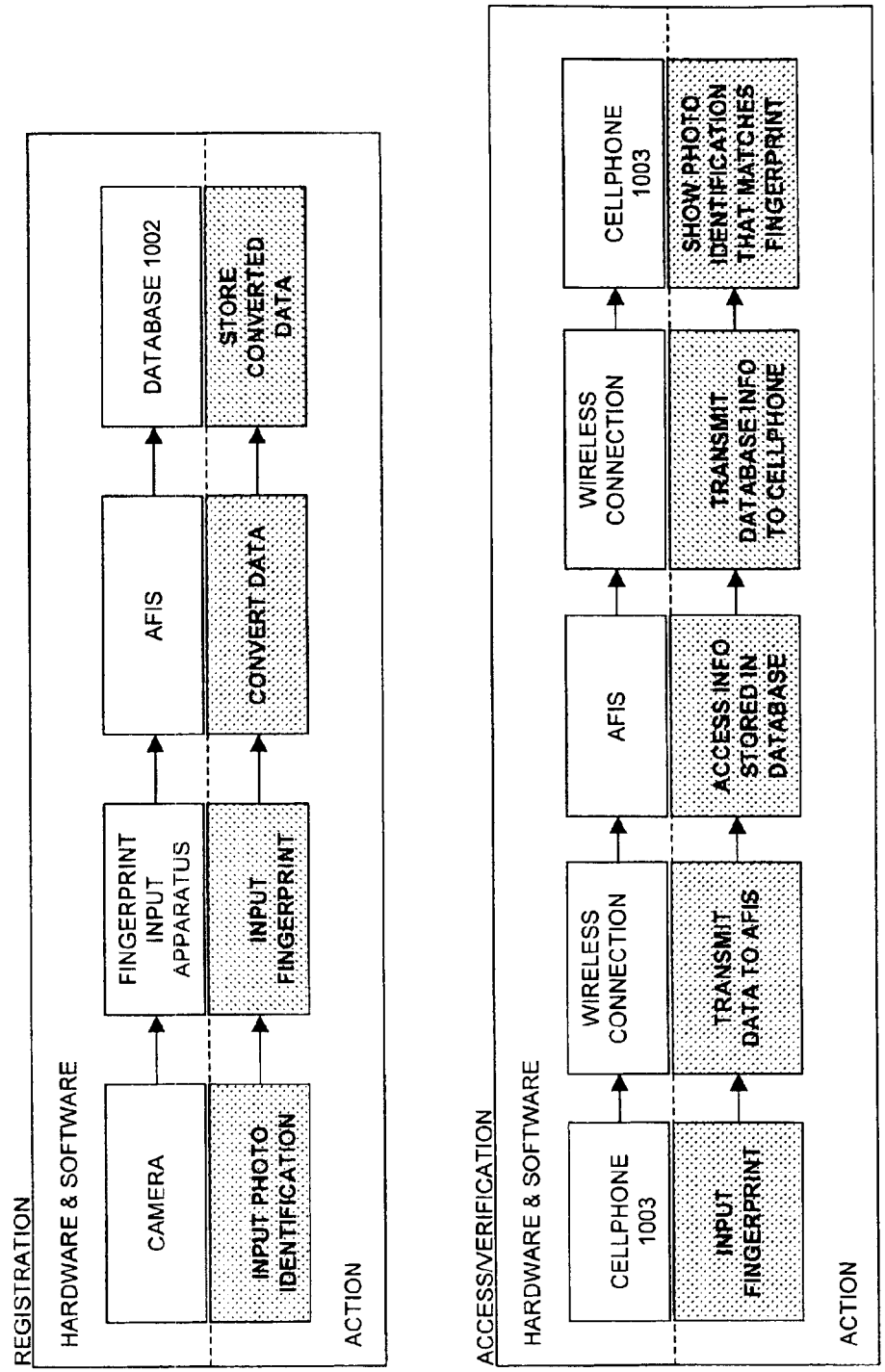
FIG. 10 is an illustration of a mobile identification (ID) solution using a cellular telephone or portable computer.

It is important in many applications to positively identify an individual using a portable device, such as a cellular telephone or laptop or handheld computer which may be equipped with a wireless connection. FIG. 10 shows a mobile ID solution. In this application, there is an initial registration 1001 where an individual has a fingerprint scanned and a picture taken. The scanned fingerprint is converted into fingerprint data using, for example, the Automated Fingerprint Identification System (AFIS) of NEC Corporation, and stored in a database 1002. The individual so registered can later be positively identified using, for example, a cellular telephone 1003 equipped with the fingerprint input apparatus according to the invention as shown in FIG. 5. The user of the cellular telephone, when prompted to do so, swipes his or her finger across the fingerprint input apparatus and the scanned fingerprint information is transmitted to the AFIS computer 1004 which accesses the database 1002. The result is the individual's picture and identifying data 1005 which can be displayed on the display of the cellular telephone for personal identification to an authority, such as an airline ticket counter.

Figure 11:
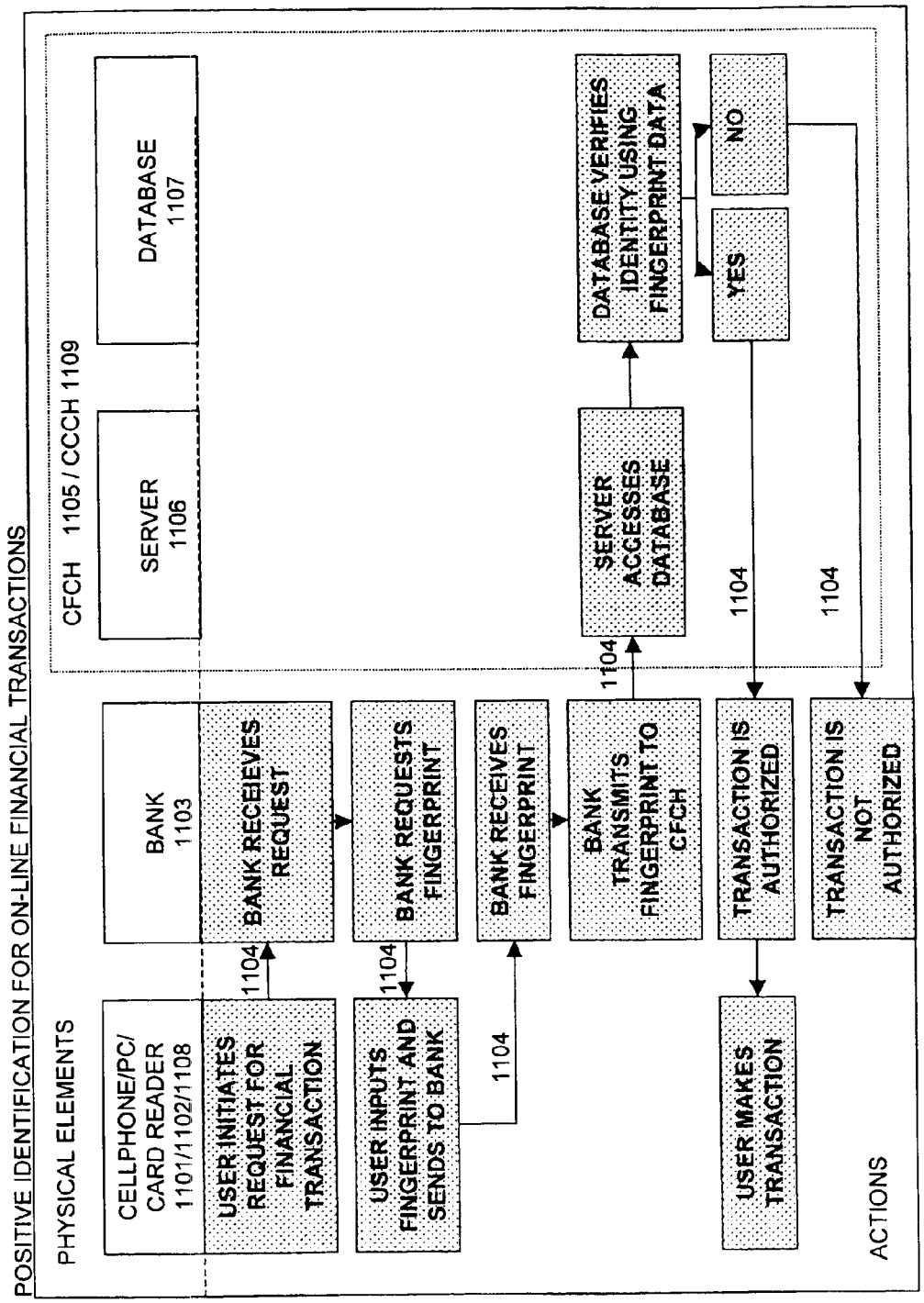
FIG. 11 is an illustration of on-line banking using a cellular telephone or PC equipped with the fingerprint input apparatus of the invention.

Positive identification of individuals is also required for on-line financial transactions, such as banking on the Internet. FIG. 11 shows a diagram of an Internet banking transaction using a cellular telephone or PC. In this application, the cellular telephone 1101 and the PC 1102 are connected to a bank 1103 via the Internet 1104. The bank 1103 is, in turn, connected to a central financial clearing house 1105 which includes a server 1106 and database 1107. In order to conduct a financial transaction via either the cellular telephone 1101 or the PC 1102, the user is prompted by the bank 1103 to input his or her fingerprint. The fingerprint data received by the bank 1103 is transmitted to the central financial clearing house 1105 where the server 1106 accesses the database 1107 to positively determine the identity of the individual wishing to conduct the financial transaction. Upon ascertaining the positive identification of the individual, the central financial clearing house 1105 may give authorization to the bank 1103 to conduct the financial transaction.

In an analogous situation, instead of a cellular telephone 1101 or a PC 1102, the financial transaction that is to be conducted may be that of a credit transaction using a card reader 1108. In this case, the owner of the credit card swipes the magnetic stripe of the credit card through the card reader 1108. The reader is also equipped with the fingerprint input apparatus according to the invention, and the owner of the credit card also inputs his or her fingerprint. Both the credit card data from the magnetic stripe and the fingerprint data are transmitted to a credit card clearing house 1109, which may or may not be the same as the financial clearing house 1105. Upon receipt of the credit card and fingerprint information, the credit card clearing house accesses a database to determine if the individual offering the credit card is the true owner and, if so, whether limits of credit have been exceeded. If the individual offering the credit card is the true owner and his or her limits of credit have not been exceeded, the credit card clearing house 1109 will issue an authorization to proceed with the credit transaction. This application of the fingerprint input apparatus according to the invention has two distinct advantages. First, it prevents fraud by insuring that the person offering a credit card in a credit transaction is the owner of the card. Second, it eliminate the need for the credit card owner to sign a credit card slip which must be manually processed.

Figure 12:
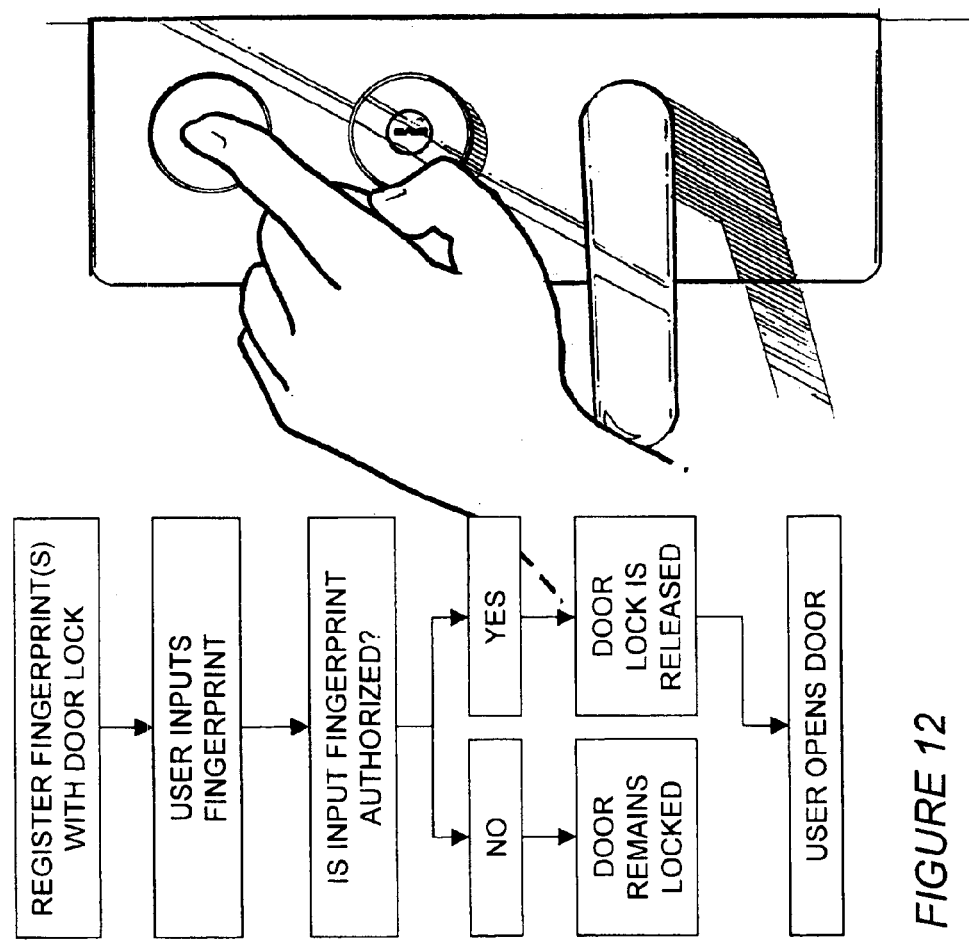
FIG. 12 is an illustration of an entry door equipped with the fingerprint input apparatus of the invention.

The fingerprint input apparatus of the invention can also be used for controlling entry into a building, room or vehicle. FIG. 12 shows an example of an entry door of a house equipped with the fingerprint input apparatus of the invention. Here, the fingerprint input apparatus according to the invention is located either on or adjacent the door. Registered fingerprints which are recognized initiate an unlocking of the door to allow entry. This application of the invention may be used control entry to private homes or large buildings, the primary difference being the number of registered fingerprints that must be maintained in a database. In the former case, personal security is assured. In the latter case, corporate or governmental security is assured.

Figure 13:
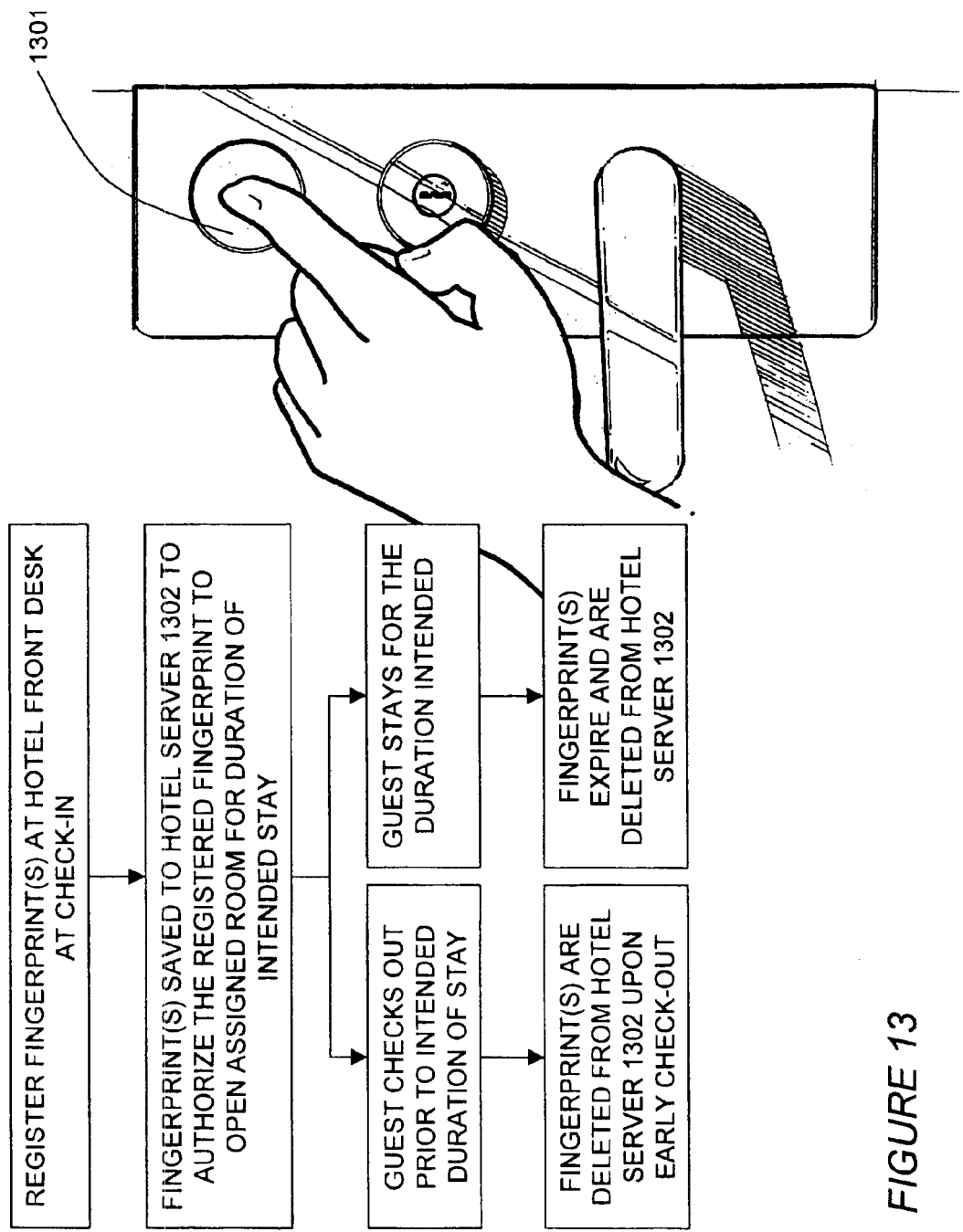
FIG. 13 is an illustration of a hotel room door equipped with the fingerprint input apparatus of the invention.

FIG. 13 shows an example of a door to a room equipped with the fingerprint apparatus of the invention. In this case, the room is that of a hotel room where, instead of a key or plastic card, the hotel guest, on registration at the hotel, also registers his or her fingerprint. This registration is temporary for the duration of the guest's stay at the hotel. As shown in FIG. 13, when the fingerprint input apparatus 1301 responds to an input fingerprint, the apparatus communicates with the hotel server 1302 to determine if the input fingerprint matches the fingerprint data on file. If it does, the lock mechanism of the door is released allowing entry. At the termination of the guest's stay at the hotel, the fingerprint data on file for that guest is deleted in the hotel server 1302.

Figure 14:
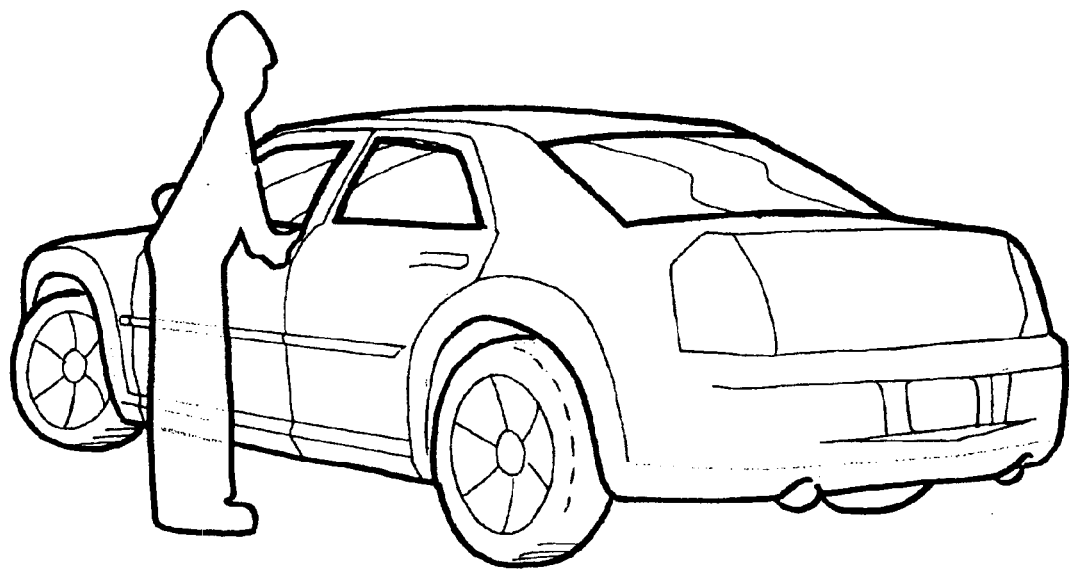
FIG. 14 is an illustration of an automobile door equipped with the fingerprint input apparatus of the invention.

FIG. 14 illustrates an automobile door equipped with the fingerprint input apparatus of the invention. This application replaces the keypad entry system available on many automobiles today. In this application, the owner/operators of the automobile each separately register his or her fingerprints in the database maintained by a central processing unit (not shown) of the automobile. The storage in the database is nonvolatile to avoid losing the information upon a disconnection of the automobile battery. Not only will the fingerprint input apparatus of the invention allow entry to the automobile, it will also enable the operation of the automobile. In this manner, a husband and a wife who both drive the automobile will each be separately recognized as authorized to enter and operate the automobile. In addition, in automobiles equipped with memory seat and mirror positions for each of the husband and the wife, upon recognition of the individual, the fingerprint input apparatus of the invention automatically initiates adjustments of the seat and mirrors for the individual recognized.

Figure 15:
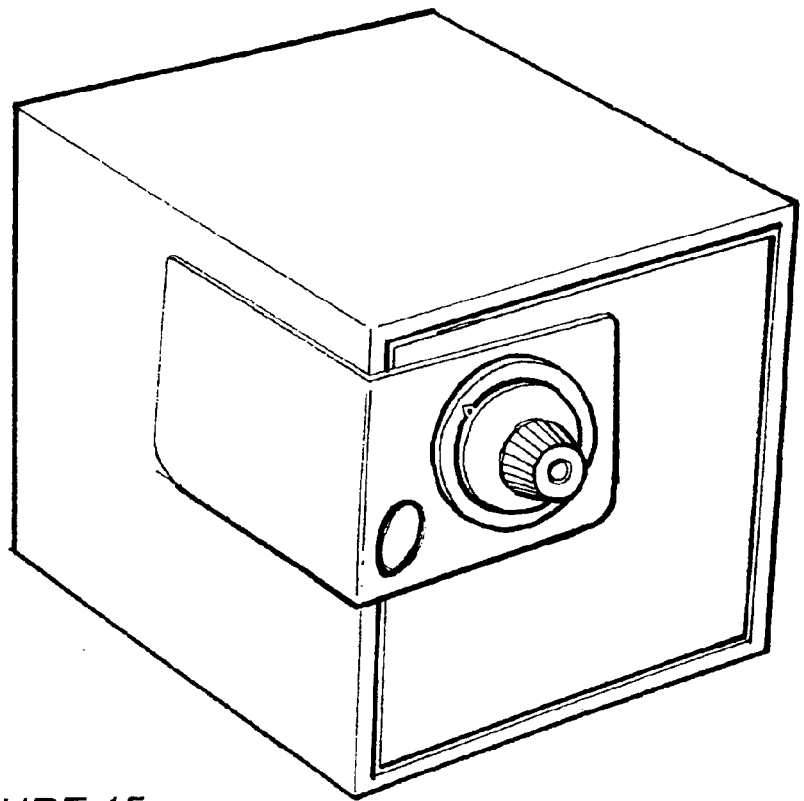
FIG. 15 is an illustration of a safe equipped with the fingerprint input apparatus of the invention.
Figure 16:
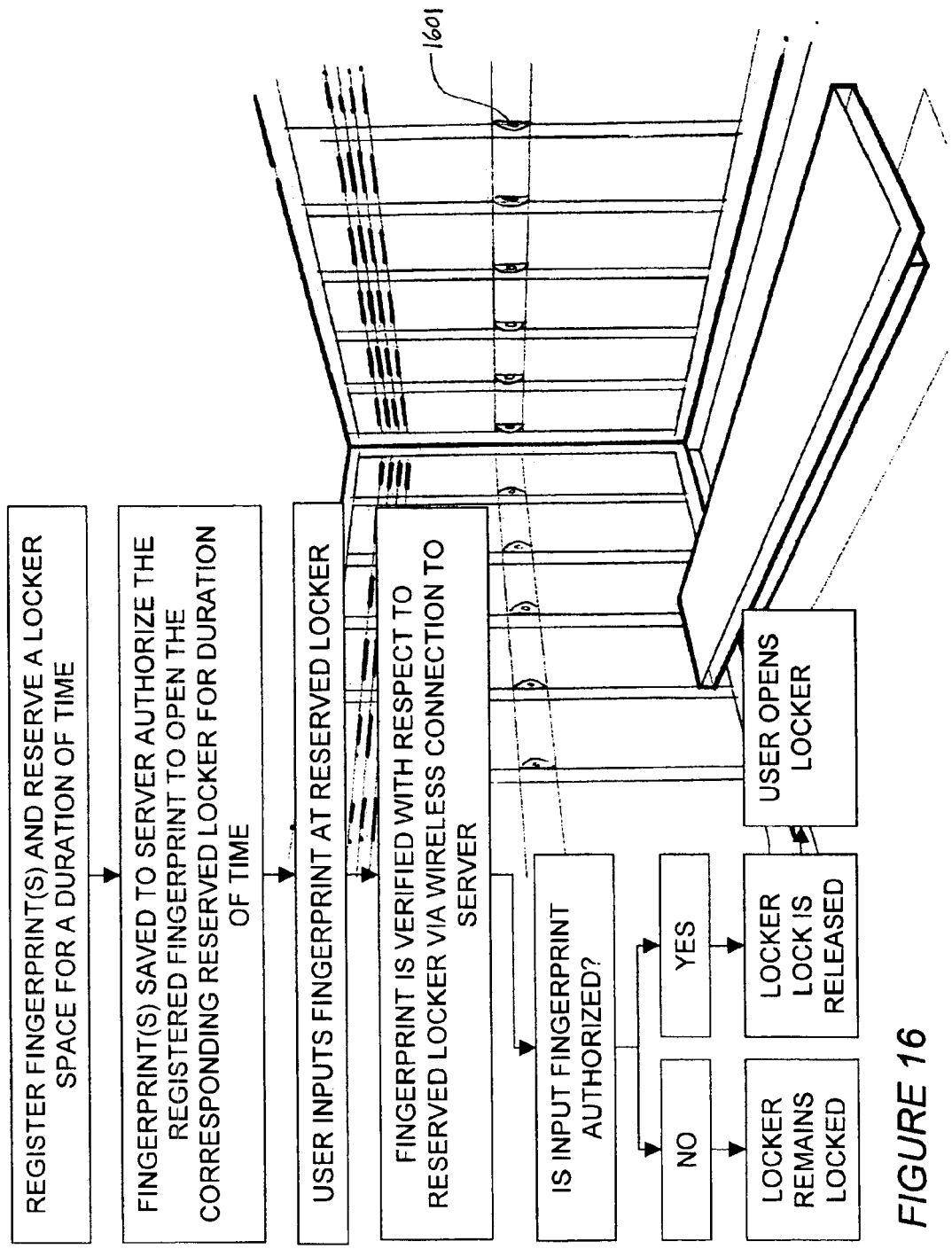
FIG. 16 is an illustration of lockers equipped with the fingerprint input apparatus of the invention.

There are a number of applications of the fingerprint input apparatus of the invention in which a container may be conditioned to open upon recognition of an individual whose fingerprint is recognized. FIG. 15 is one such example where a safe is equipped with the fingerprint input apparatus according to the invention. This eliminates the need for a lock, such as a combination lock, for the safe. Moreover, the safe may be one that is used in a hotel room to allow guests to safely store valuables during their absence from the room. As in the case of the hotel room door illustrated in FIG. 13, the fingerprint input apparatus would communicate with the hotel server so that the safe is temporarily enabled for the currently registered guest, eliminating the need for the guest to input a temporary PIN or combination to use the safe. Likewise, as illustrated in FIG. 16, lockers such as may be used at a health club may be equipped with the fingerprint input apparatus according to the invention. And as in the case of the hotel room door illustrated in FIG. 13 and the safe illustrated in FIG. 15, the fingerprint input apparatus 1601 on the lockers may be connected to a central server 1602 which controls access to the lockers. Assignments of lockers may be made on a daily, monthly or annual basis, depending on the contact with the individuals using the lockers.

Figure 17:
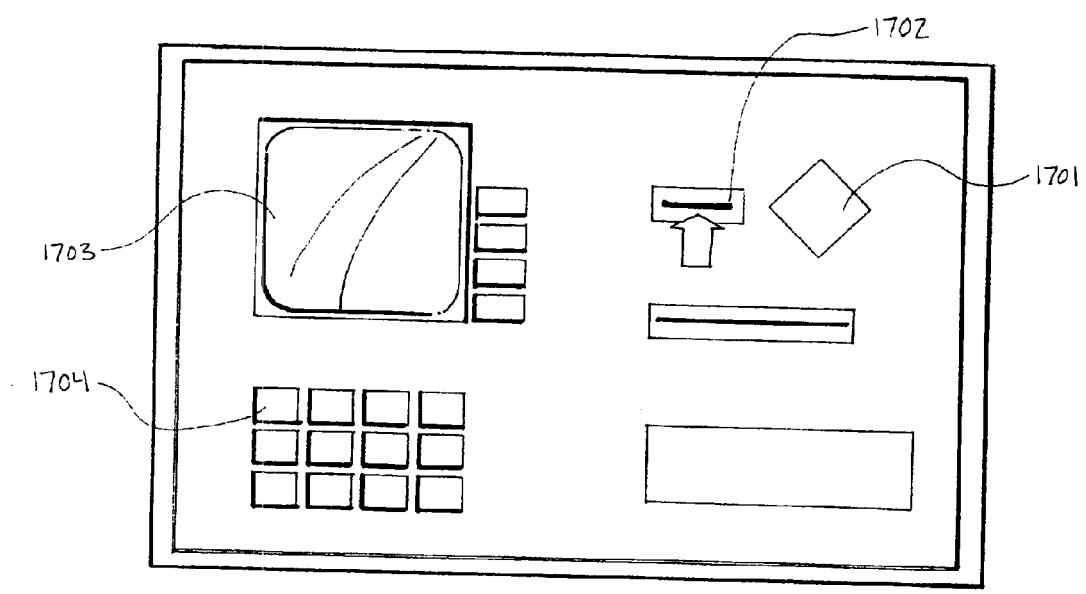
FIG. 17 is an illustration of an automatic teller machine (ATM) equipped with the fingerprint input apparatus of the invention.
Figure 18:
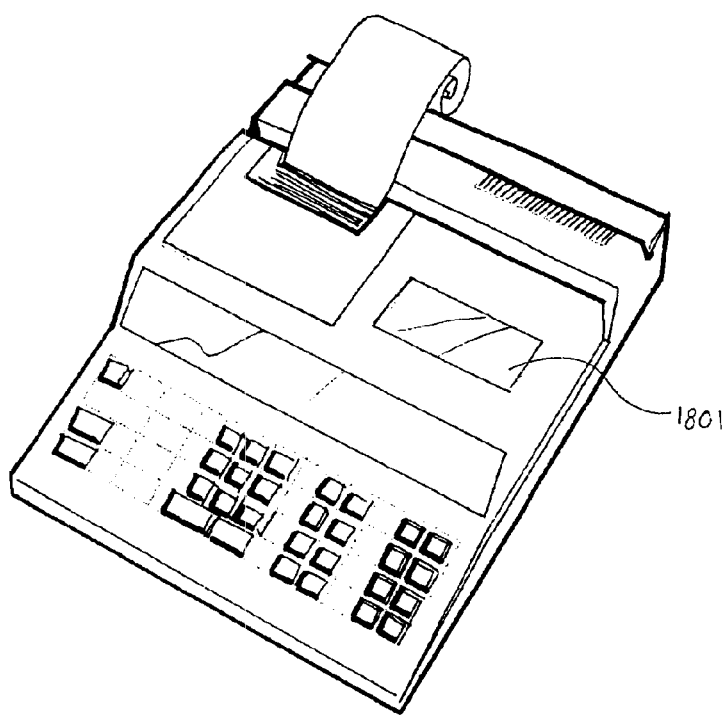
FIG. 18 is an illustration of a teller terminal equipped with the fingerprint input apparatus of the invention.

FIG. 17 is an illustration of an Automated Teller Machine (ATM) which is equipped with the fingerprint input apparatus according to the invention. In this example, the ATM has a fingerprint input apparatus 1701, a card reader 1702, a display 1703, and a keypad 1704. The operation of the ATM is similar to that of a conventional ATM but instead of entering a PIN, the individual conducting a transaction inputs his or her fingerprint using the fingerprint input apparatus 1701. In a similar manner, a teller terminal within a bank may be equipped with the fingerprint input apparatus according to the invention, as shown in FIG. 18. The operator of the terminal, instead of inputting a code or PIN or swiping a card or badge, inputs his or her fingerprint using the fingerprint input apparatus 1801. The teller terminal is made accessible to the user upon positive identification of the fingerprint data.

Figure 19:
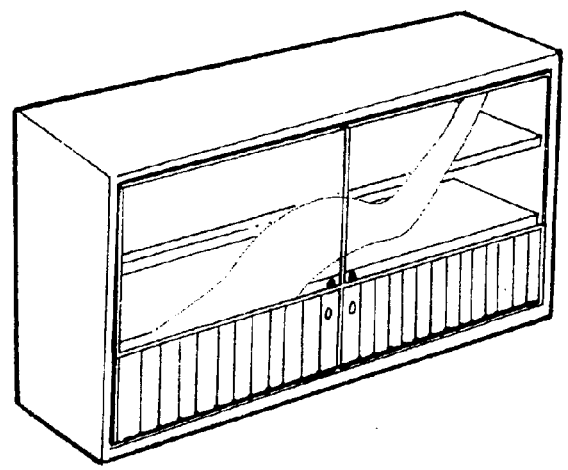
FIG. 19 is an illustration of a jewelers shop case equipped with the fingerprint input apparatus of the invention.
Figure 20:
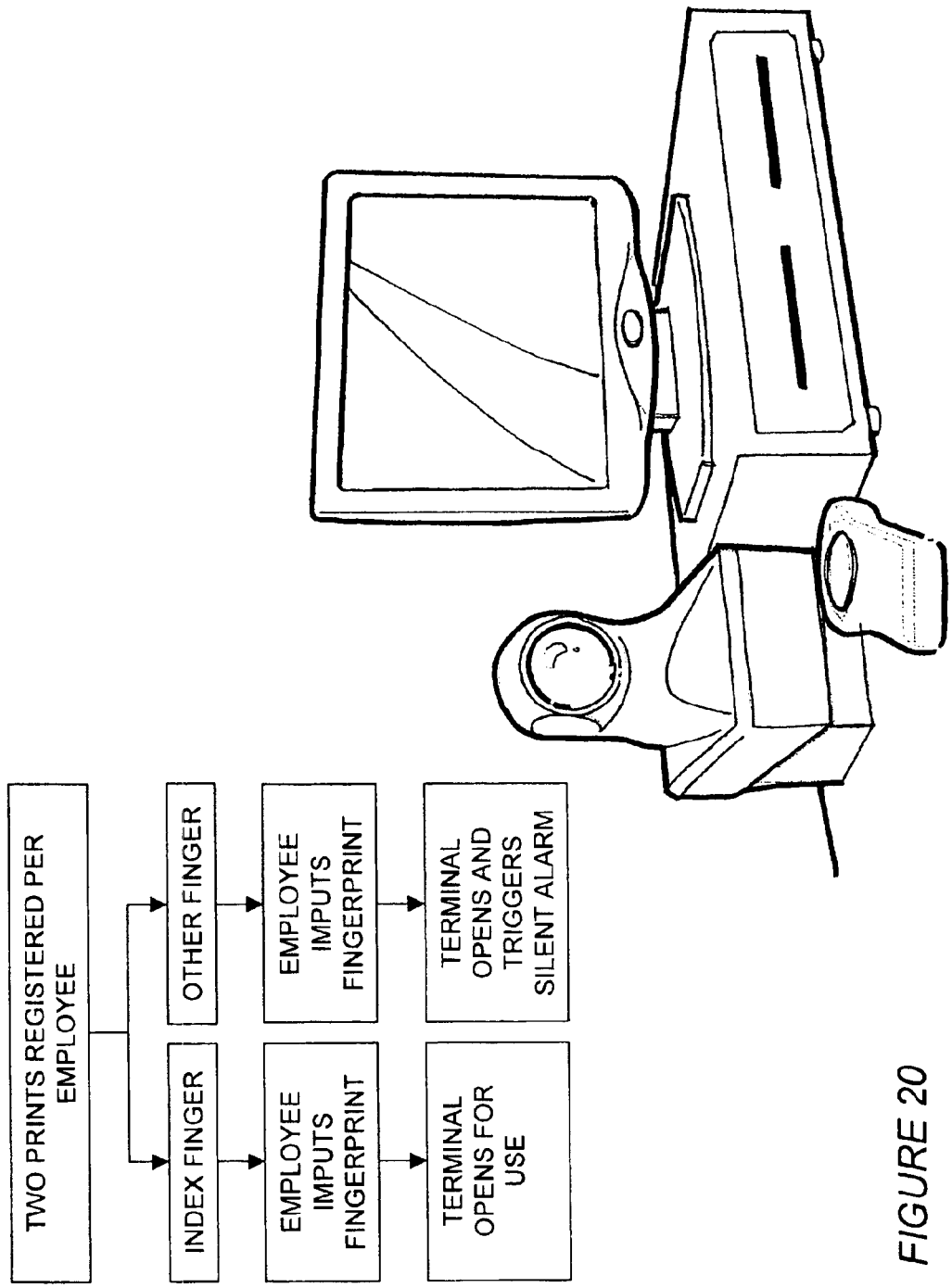
FIG. 20 is an illustration of a point of sale (POS) system equipped with the fingerprint input apparatus of the invention.

The fingerprint input apparatus according to the invention also makes possible an alarming function. FIG. 19 shows an example of a jewelers case, and FIG. 20 shows an example of a point of sale (POS) terminal, or cash register. In both examples, registration of the persons authorized to open the jewelers case or the POS terminal involves registering two different fingerprints, say the index finger and the middle finger, but any two different fingerprints could be used. Ordinarily, one of the fingers, say the index finger, is used to authorize access to the jewelers case or the POS terminal. However, in the case of an emergency, such as an attempted robbery, the second finger is used to alert the police or other security personnel.

Figure 21:
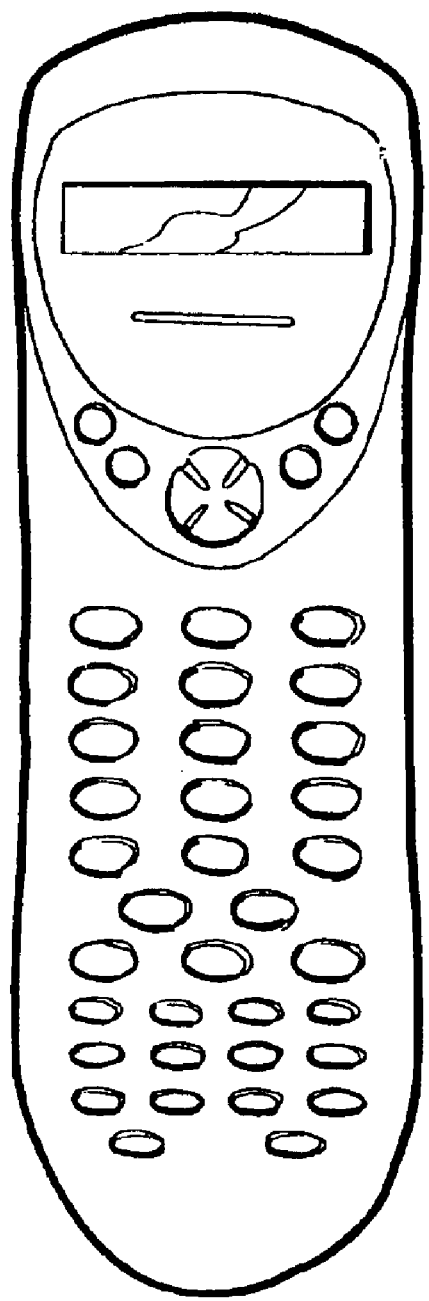
FIG. 21 is an illustration of a television remote control device equipped with the fingerprint input apparatus of the invention.

FIG. 21 shows yet another application of the fingerprint input apparatus according to the invention, in this case, a remote control device for a television receiver. Using the fingerprint input apparatus of the invention, the remote control device may be programmed to control access to various channels. So, for example, a "parent's guide" to TV ratings may be used to inhibit access to certain channels but access would be permitted to those for which fingerprints have been registered.

These several fingerprint apparatus are made possible by the simplicity of design and economy of manufacture of the fingerprint input apparatus according to the invention. Positive identification of individuals can now be made on a broad and economic scale which was heretofore not possible.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. An image sensor adapted to generate an electrical signal representing an image of a skin surface of a finger, said image sensor comprising:
   a transparent cover having first and second surfaces;
   a plurality of light responsive means arranged under said second surface of said cover in a narrow line-type array, wherein when said first surface of said cover is in sliding contact with said skin surface of said finger, said light responsive means being responsive only to light directly emerging from an inside of said finger through said cover to generate an electrical signal representing a raw image of a fingerprint as said skin surface is slid across said first surface of said cover; and
   means responsive to said electrical signal representing a raw image of a fingerprint for reconstructing an image of the fingerprint when the skin surface of said finger is swiped across and perpendicular to said narrow line-type array.

2. Fingerprint apparatus for controlling a door for entry into a building, room or vehicle comprising:
   an image sensor adapted to generate an electrical signal representing an image of a skin surface of a finger, said image sensor including:
   a transparent cover having first and second surfaces; and
   a plurality of light responsive means arranged under said second surface of said cover, when said first surface of said cover is in contact with said skin surface of said finger, said light responsive means being responsive only to light directly emerging from an inside of said finger through said cover to generate said electrical signal representing said image of said skin surface of a finger;
   data storage means for registering fingerprint data of individuals authorized to enter the building, room or vehicle; and
   a lock mechanism at a door responsive to said image sensor for accessing said data storage means, and if an input fingerprint matches fingerprint data stored in said data storage means, permitting entry to the building, room or vehicle.

3. The fingerprint apparatus of claim 2, wherein the apparatus controls entry to a room in a hotel and the data storage means is a server for registering guests for temporary stays, the fingerprint data for a guest being deleted upon termination of a temporary stay at the hotel.

4. The fingerprint apparatus of claim 3, wherein the apparatus further controls access to a hotel room safe.

5. The fingerprint apparatus of claim 2, wherein the apparatus controls entry to a vehicle for which a plurality of operators may be registered in said data storage means, said data storage means further storing information on individual seat and mirror position positions for each registered operator and said lock mechanism initiating seat and mirror positioning upon permitting entry to the vehicle.

6. The fingerprint apparatus of claim 2, wherein the a plurality of light responsive elements under said second surface of said cover are arranged in a narrow line-type array, and further comprising means for reconstructing an image of a fingerprint when the skin surface of said finger is swiped across and perpendicular to said narrow line-type array.

7. Fingerprint apparatus for controlling access to a safe, locker or display case for securing cash, documents, securities and/or valuables comprising:
   an image sensor adapted to generate an electrical signal representing an image of a skin surface of a finger, said image sensor including:
   a transparent cover having first and second surfaces; and
   a plurality of light responsive means arranged under said second surface of said cover, when said first surface of said cover is in contact with said skin surface of said finger, said light responsive means being responsive only to light directly emerging from an inside of said finger through said cover to generate said electrical signal representing said image of said skin surface of a finger;

data storage means for registering fingerprint data of individuals authorized to access the safe, locker or display case; and a lock mechanism responsive to responsive to said image sensor for accessing said data storage means, and if an input fingerprint matches fingerprint data stored in said data storage means, permitting access to the safe, locker or display case.

8. The fingerprint apparatus of claim 7, wherein the apparatus controls access to a safe or locker and the data storage means is a server for registering users of the safe or locker for a temporary period of time, the fingerprint data for a user being deleted upon termination of the temporary period of time.

9. The fingerprint apparatus of claim 7, wherein the apparatus controls access to a safe or a display case and the data storage means registers first and second fingerprint data of individuals authorized to access the safe or display case, said lock mechanism upon matching said first fingerprint data stored in said data storage means, permitting access to the safe or display case but upon matching said second fingerprint data stored in said data storage means generates an emergency signal.

10. The fingerprint apparatus of claim 7, wherein the a plurality of light responsive elements under said second surface of said cover are arranged in a narrow line-type array, and further comprising means for reconstructing an image of a fingerprint when the skin surface of said finger is swiped across and perpendicular to said narrow line-type array.

11. Fingerprint apparatus for controlling authenticating a user of a telephone, personal computer, terminal or communication device comprising:

an image sensor adapted to generate an electrical signal representing an image of a skin surface of a finger, said image sensor including:

a transparent cover having first and second surfaces; and a plurality of light responsive means arranged under said second surface of said cover, when said first surface of said cover is in contact with said skin surface of said finger, said light responsive means being responsive only to light directly emerging from an inside of said finger through said cover to generate said electrical signal representing said image of said skin surface of a finger;

data storage means for registering fingerprint data of individuals; and authenticating means accessing said data storage means for authenticating a user of the telephone, personal computer or terminal upon matching an image of a fingerprint input by the user with fingerprint data stored in data storage means.

12. The fingerprint apparatus of claim 11, wherein the terminal is an automated teller machine (ATM) which, upon authentication of a user, permits a user initiated financial transaction.

13. The fingerprint apparatus of claim 11, wherein the terminal is a teller terminal which, upon authentication of a user, permits user initiated financial transactions.

14. The fingerprint apparatus of claim 11, wherein the telephone is a cellular telephone and the plurality of light responsive elements under said second surface of said cover are arranged in a narrow line-type array, further comprising means for reconstructing an image of a fingerprint when the skin surface of said finger is swiped across and perpendicular to said narrow line-type array.

15. The fingerprint apparatus of claim 11, wherein the PC is connected in a local area network (LAN) and, upon identification of the user of the PC, initiates a login procedure to the LAN.

16. The fingerprint apparatus of claim 11, wherein the communication device is a television receiver and the image sensor is incorporated into a remote control device for controlling access to channels on the television receiver.

17. The fingerprint apparatus of claim 16, wherein the plurality of light responsive elements under said second surface of said cover are arranged in a narrow line-type array, and further comprising means for reconstructing an image of a fingerprint when the skin surface of said finger is swiped across and perpendicular to said narrow line-type array.

18. Fingerprint apparatus for controlling credit card transactions comprising:

a credit card reader incorporating an image sensor adapted to generate an electrical signal representing an image of a skin surface of a finger, said image sensor including:

a transparent cover having first and second surfaces; and a plurality of light responsive means arranged under said second surface of said cover, when said first surface of said cover is in contact with said skin surface of said finger, said light responsive means being responsive only to light directly emerging from an inside of said finger through said cover to generate said electrical signal representing said image of said skin surface of a finger;

data storage means for registering fingerprint data of individuals to whom credit cards have been issued; and a database system receiving credit card and fingerprint data and accessing said data storage means for determining if the person offering the credit card for a credit transaction is the owner of the credit card.

19. The fingerprint apparatus of claim 18, wherein the database system also determines if the person offering the credit card for a credit transaction has sufficient credit for the transaction and, if so, authorizing the transaction.

20. The fingerprint apparatus of claim 18, wherein the a plurality of light responsive elements under said second surface of said cover are arranged in a narrow line-type array, and further comprising means for reconstructing an image of a fingerprint when the skin surface of said finger is swiped across and perpendicular to said narrow line-type array.

21. Fingerprint method for controlling a door for entry into a building, room or vehicle comprising the steps of:

affixing an image sensor adapted to generate an electrical signal representing an image of a skin surface of a finger to or adjacent to the door, said image sensor including:

a transparent cover having first and second surfaces; and a plurality of light responsive means arranged under said second surface of said cover, when said first surface of said cover is in contact with said skin surface of said finger, said light responsive means being responsive only to light directly emerging from an inside of said finger through said cover to generate said electrical signal representing said image of said skin surface of a finger;

registering in data storage means fingerprint data of individuals authorized to enter the building, room or vehicle; and in response to a fingerprint applied to said image sensor, accessing the data storage means, and if an input fingerprint matches fingerprint data stored in said data storage means, permitting entry to the building, room or vehicle.

22. The fingerprint method of claim 21, wherein the method controls entry to a room in a hotel and the data storage means is a server for registering guests for temporary stays, further comprising the step of deleting the fingerprint data for a guest upon termination of a temporary stay at the hotel.

23. The fingerprint method of claim 21, wherein the method further controls access to a hotel room safe.

24. The fingerprint method of claim 21, wherein the method controls entry to a vehicle for which a plurality of operators may be registered in said data storage means, further comprising the steps of:
   storing information on individual seat and mirror position positions for each registered operator said data storage means; and
   initiating seat and mirror positioning upon permitting entry to the vehicle.

25. The fingerprint method of claim 21, wherein the a plurality of light responsive elements under said second surface of said cover are arranged in a narrow line-type array, and further comprising the step of reconstructing an image of a fingerprint when the skin surface of said finger is swiped across and perpendicular to said narrow line-type array.

26. Fingerprint method for controlling access to a safe, locker or display case for securing cash, documents, securities and/or valuables comprising the steps of:
   affixing to the save locker or display case an image sensor adapted to generate an electrical signal representing an image of a skin surface of a finger, said image sensor including:
   a transparent cover having first and second surfaces; and
   a plurality of light responsive means arranged under said second surface of said cover, when said first surface of said cover is in contact with said skin surface of said finger, said light responsive means being responsive only to light directly emerging from an inside of said finger through said cover to generate said electrical signal representing said image of said skin surface of a finger;
   registering fingerprint data in a data storage means of individuals authorized to access the safe, locker or display case; and
   in response to a fingerprint applied to the image sensor, accessing said data storage means, and if an input fingerprint matches fingerprint data stored in said data storage means, permitting access to the safe, locker or display case.

27. The fingerprint method of claim 26, wherein the method controls access to a safe or locker and the data storage means is a server for registering users of the safe or locker for a temporary period of time, further comprising the step of deleting the fingerprint data for a user upon termination of the temporary period of time.

28. The fingerprint method of claim 26, wherein the method controls access to a safe or a display case, further comprising the steps of:
   registering in the data storage means first and second fingerprint data of individuals authorized to access the safe or display case;
   upon matching said first fingerprint data stored in said data storage means, permitting access to the safe or display case; and
   upon matching said second fingerprint data stored in said data storage means generating an emergency signal.

29. The fingerprint method of claim 26, wherein the a plurality of light responsive elements under said second surface of said cover are arranged in a narrow line-type array, and further comprising the step of reconstructing an image of a fingerprint when the skin surface of said finger is swiped across and perpendicular to said narrow line-type array.

30. Fingerprint method for controlling authenticating a user of a telephone, personal computer, terminal or communication device comprising:
   affixing to the telephone, personal computer, terminal or communication device an image sensor adapted to generate an electrical signal representing an image of a skin surface of a finger, said image sensor including:
   a transparent cover having first and second surfaces; and
   a plurality of light responsive means arranged under said second surface of said cover, when said first surface of said cover is in contact with said skin surface of said finger, said light responsive means being responsive only to light directly emerging from an inside of said finger through said cover to generate said electrical signal representing said image of said skin surface of a finger;
   registering in data storage means fingerprint data of individuals; and
   accessing said data storage means for authenticating a user of the telephone, personal computer or terminal upon matching an image of a fingerprint input by the user with fingerprint data stored in data storage means.

31. The fingerprint method of claim 30, wherein the terminal is an automated teller machine (ATM) further comprising the step, upon authentication of a user, permitting a user initiated financial transaction.

32. The fingerprint method of claim 30, wherein the terminal is a teller terminal further comprising the step, upon authentication of a user, permitting user initiated financial transactions.

33. The fingerprint method of claim 30, wherein the telephone is a cellular telephone and the plurality of light responsive elements under said second surface of said cover are arranged in a narrow line-type array, further comprising the step of reconstructing an image of a fingerprint when the skin surface of said finger is swiped across and perpendicular to said narrow line-type array.

34. The fingerprint method of claim 30, wherein the PC is connected in a local area network (LAN), further comprising the step, upon identification of the user of the PC, initiating a login procedure to the LAN.

35. The fingerprint method of claim 30, wherein the communication device is a television receiver and the image sensor is incorporated into a remote control device for controlling access to channels on the television receiver.

36. The fingerprint method of claim 35, wherein the plurality of light responsive elements under said second surface of said cover are arranged in a narrow line-type array, further comprising the step of reconstructing an image of a fingerprint when the skin surface of said finger is swiped across and perpendicular to said narrow line-type array.

37. Fingerprint method for controlling credit card transactions comprising:
   incorporating into a credit card reader an image sensor adapted to generate an electrical signal representing an image of a skin surface of a finger, said image sensor including:

a transparent cover having first and second surfaces; and a plurality of light responsive means arranged under said second surface of said cover, when said first surface of said cover is in contact with said skin surface of said finger, said light responsive means being responsive only to light directly emerging from an inside of said finger through said cover to generate said electrical signal representing said image of said skin surface of a finger;

registering in a data storage means fingerprint data of individuals to whom credit cards have been issued; and receiving credit card and fingerprint data by a database system and accessing said data storage means for determining if the person offering the credit card for a credit transaction is the owner of the credit card.

38. The fingerprint method of claim 37, further comprising the steps of:

determining by the database system if the person offering the credit card for a credit transaction has sufficient credit for the transaction; and, if so, authorizing the transaction.

39. The fingerprint method of claim 37, wherein the a plurality of light responsive elements under said second surface of said cover are arranged in a narrow line-type array, and further comprising the step of reconstructing an image of a fingerprint when the skin surface of said finger is swiped across and perpendicular to said narrow line-type array.

* * * * *